J. L. GOODIN.
Apparatus for Applying Poison to Plants.
No. 198,014. Patented Dec. 11, 1877.
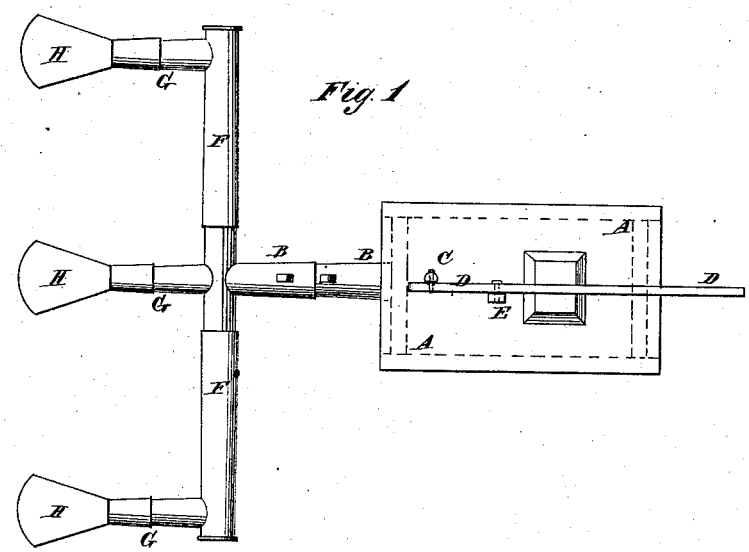
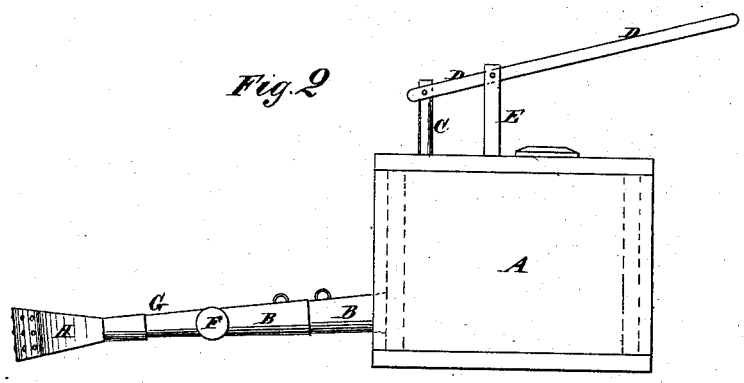
WITNESSES:
INVENTOR:
ATTORNEYS.

UNITED STATES PATENT OFFICE.

JAMES L. GOODIN, OF MONTGOMERY, TEXAS.

IMPROVEMENT IN APPARATUS FOR APPLYING POISON TO PLANTS.

Specification forming part of Letters Patent No. 198,014, dated December 11, 1877; application filed October 6, 1877.

*To all whom it may concern:*

Be it known that I, JAMES L. GOODIN, of Montgomery, in the county of Montgomery and State of Texas, have invented a new and useful Improvement in Apparatus for Applying Poison to Cotton and Potato Plants, of which the following is a specification:

Figure 1 is a top view of my improved apparatus. Fig. 2 is a side view of the same.

Similar letters of reference indicate corresponding parts.

The object of this invention is to furnish an improved apparatus for applying poison to cotton and potato plants, to destroy worms and bugs, which shall be simple in construction, inexpensive in manufacture, convenient in use, and effective in operation.

The invention consists in the combination of the tank provided with the valve-stem, lever, and standard, the pipes, and the perforated heads, with each other, as hereinafter fully described, to adapt it for use, as set forth.

A represents a tank of any desired shape and size, to receive water saturated or mixed with the poison.

In the lower part of the forward end of the tank A is secured a discharge-pipe, B, the inner end of which is provided with a valve or ordinary sirup-faucet. The stem C of the valve or faucet passes up through a hole in the top of the tank A, and its upper end is pivoted to the end of a lever, D, which is pivoted to a short standard, E, attached to the top of the tank A.

To the forward end of the pipe B is attached a cross-pipe, F, from the forward side of the center and ends of which project short pipes G, having heads H attached to their forward ends. The heads H are perforated with numerous small holes, to allow the poisonous solution to be sprinkled upon the plants.

The apparatus may be carried upon wheels, or in any other convenient way. The pipes B F are jointed, as shown in the drawing, so that they may be lengthened or shortened, as circumstances may require.

The inner end of the pipe B may be provided with a strainer, to prevent coarse substances from entering the pipes and choking them.

Having thus described my invention, I claim as new and desire to secure by Letters Patent—

The combination of the tank A, provided with the valve-stem C, lever D, and standard E, the pipes B F G, and the perforated heads H, with each other, substantially as herein shown and described, to adapt it for use, as set forth.

JAMES LOUIS GOODIN.

Witnesses:
   D. N. CARROLL,
   ALLEN LOWERY.